R. A. WORNSTAFF.
COMBINATION MOTOR VEHICLE.
APPLICATION FILED JULY 8, 1919.
1,346,778.
Patented July 13, 1920.
2 SHEETS—SHEET 1.
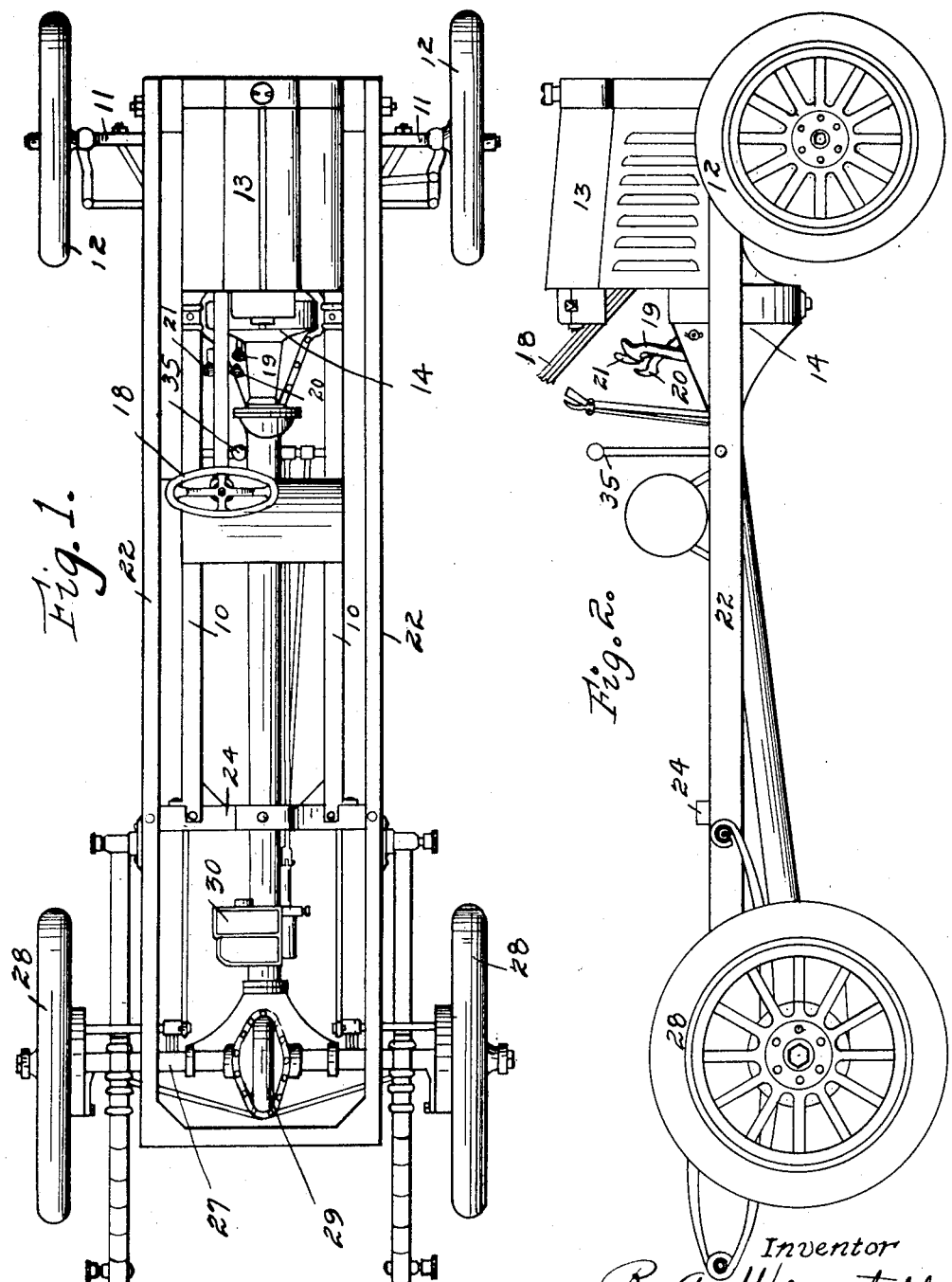

R. A. WORNSTAFF.
COMBINATION MOTOR VEHICLE.
APPLICATION FILED JULY 8, 1919.
1,346,778.
Patented July 13, 1920.
2 SHEETS—SHEET 2.
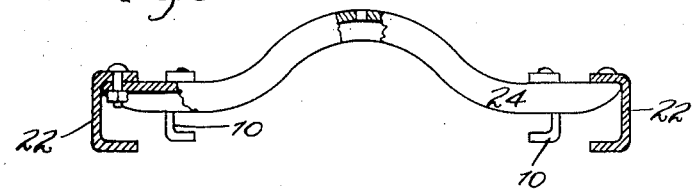
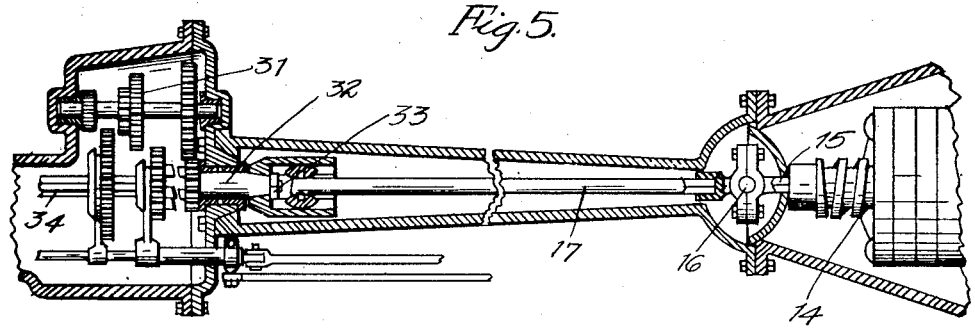
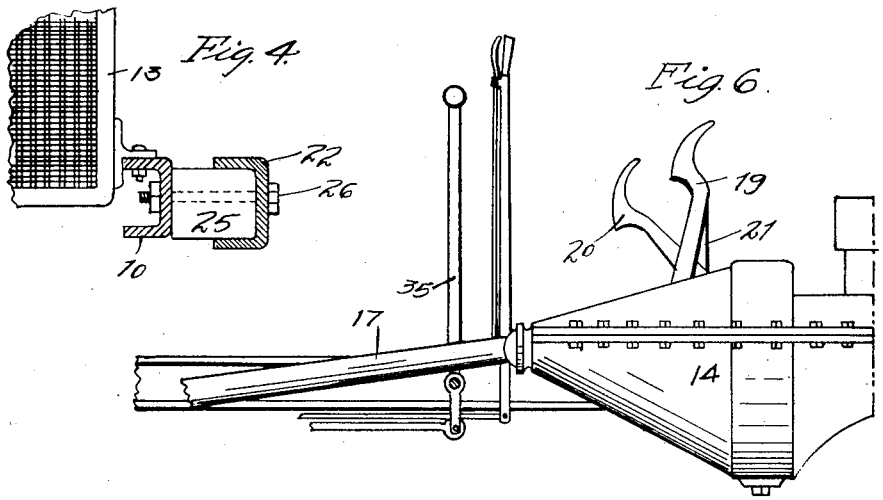
Inventor
R. A. Wornstaff
By Orwig & Bair attys.

UNITED STATES PATENT OFFICE.

RICHARD A. WORNSTAFF, OF WELDON, IOWA.

COMBINATION MOTOR-VEHICLE.

1,346,778.  Specification of Letters Patent.  Patented July 13, 1920.

Application filed July 8, 1919. Serial No. 309,403.

*To all whom it may concern:*

Be it known that I, RICHARD A. WORNSTAFF, a citizen of the United States, and a resident of Weldon, in the county of Decatur and State of Iowa, have invented a certain new and useful Combination Motor-Vehicle, of which the following is a specification.

The object of my invention is to provide a combination vehicle preferably by taking the front end of a Ford chassis after the rear portion thereof has been removed, and adding thereto the rear end of an Overland chassis and connecting the drive shafts together, thereby utilizing the planetary transmission of a Ford with a transmission of the Overland for making a car adapted to be used as a pleasure car or as a truck and having available a great variety of speeds.

A further object of my device is to provide a motor vehicle having a sliding gear transmission thereon and placing a planetary type transmission between the motor and the sliding gear transmission, whereby the planetary transmission serves as a clutch and at the same time provides a means whereby a great number of variable speeds are obtained for either operating the device as a truck or a pleasure car.

A further object of my device is to provide a motor vehicle having a sliding gear transmission and a planetary transmission thereon, the planetary transmission being utilized as a clutch whereby variable speed and variable power is transmitted to the traction or rear wheels, thereby providing a device that is capable of a high speed and a small amount of power or a slow speed and a great amount of power.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a top or plan view of a combination vehicle embodying my invention.

Fig. 2 shows a side elevation of the same.

Fig. 3 shows a detail view partly in section illustrating the manner of connecting the rear end of the frame of one chassis with the frame of the other chassis.

Fig. 4 shows a detail, sectional view illustrating the method of connecting the two frames at the forward end of the machine.

Fig. 5 shows a horizontal, sectional view of the rear portion of the transmission, and Fig. 6 shows a side elevation of the forward part of the transmission.

In the accompanying drawings I have used the reference numeral 10 to indicate generally the horizontal longitudinal frame members of a motor vehicle chassis, such, for instance, as the Ford. At the forward end of the frame is an axle 11 having mounted thereon the steerable wheels 12. At the front of the frame is the ordinary engine 13, connected with a variable speed gearing device 14 preferably of the planetary type such as used in Fords. Extending from the gear 14 is a shaft 15 connected by a universal joint 16 with a rearwardly extending drive shaft 17.

The forward frame has the ordinary steering mechanism 18, and the foot pedals 19, 20 and 21 for controlling the gearing and the brake.

Connected with the forward frame is the main frame and the rear portion of a chassis, the motor vehicle having the rear axle selective gear transmission.

The rear frame includes the side frame members 22 which extend forwardly outside the frame members 10, as illustrated in Figs. 1 and 3.

At the rear end of the forward frame is a transverse frame member 24, the ends of which project beyond the frame members 10 and are bolted to the frame members 22.

At the forward end of the two frames, the frame members 22 are connected with the frame members 10 by means of spacing blocks 25 and bolts 26.

The rear frame supports an axle 27 having at its ends the traction wheels 28. The axle is operatively connected with a suitable differential 29.

Mounted in a gear casing 30 is a selective speed transmission gear of the sliding gear type indicated generally by the reference character 31. The selective gearing device 31 is connected by a shaft 32 and a universal joint 33 with the drive shaft 17, and is connected by means of a shaft 34 with a differential 29.

The gear 31 is controlled in the ordinary way by means of a lever 35 located near the foot pedal hereinbefore described.

It will be seen that by combining the front part of one chassis with the rear portion of another in the manner shown herein, I have provided a completed chassis which may be used for truck purposes or for pleasure driving, and on account of the great variety of speeds which may be secured by properly operating both sets of variable speed transmissions, the vehicle has a flexibility when used which could not otherwise be obtained.

Some changes may be made in the details of construction and arrangement of the parts of my improved device without departing from the essential features of my invention, and it is my intention to cover by my claim any modified forms of structure or use of mechanical equivalents which may be reasonably included within their scope.

I claim as my invention:

A combination motor vehicle comprising an inner and an outer longitudinal frame member, one of said frame members being adapted to extend in between the other and to be spaced therefrom, steerable wheels mounted on said inner frame member, an engine having a variable speed transmission operatively connected therewith, supported by said inner frame member, a steering wheel connected with said steerable wheels, foot actuated pedals placed adjacent to said steering wheel, for operating said transmission, a transverse frame member mounted on the rear ends of said inner longitudinal frame, said transverse frame member being designed to have its ends extend out beyond said inner frame, whereby it may be secured to said outer frame, the outer frame member being provided with an axle having a differential member mounted intermediate of its ends, traction wheels mounted on said axle, a transmission gearing device operatively connected with said differential member, a drive shaft for connecting said first transmission with said second transmission gearing device, whereby power from the engine may be transmitted to the traction wheels, manually operable levers spaced adjacent to said steering wheel for operating said last described transmission gearing device, a spacing block mounted between said inner and outer frames at their forward ends, and means adapted to extend through said spacing block for securing said inner and outer frames together at their forward ends.

Des Moines, Iowa, June 11, 1919.

RICHARD A. WORNSTAFF.